Figure 1:
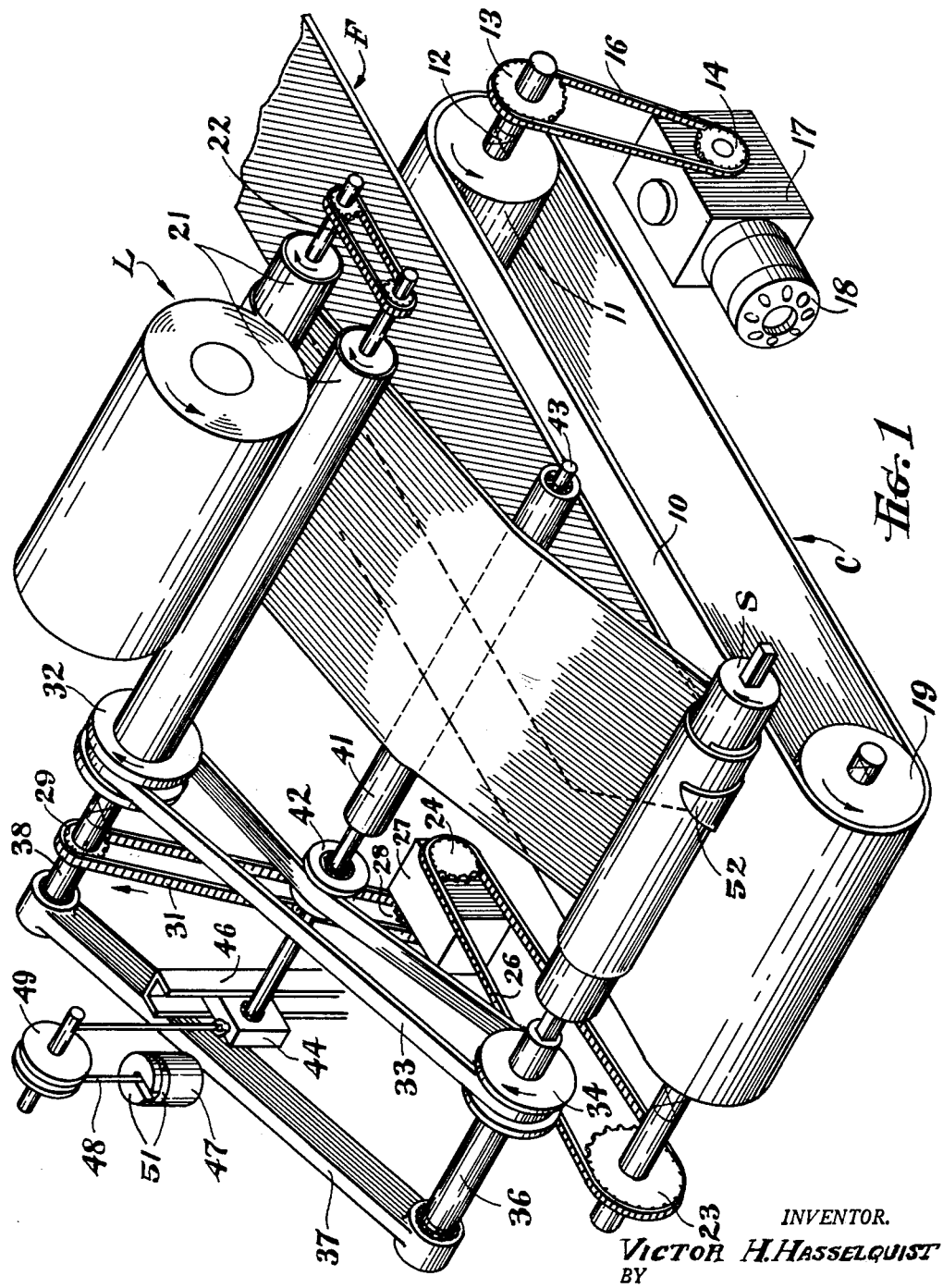

INVENTOR.
VICTOR H. HASSELQUIST
BY
C. E. Tripp

INVENTOR.
VICTOR H. HASSELQUIST
BY
C.E. Tripp 3,006,569
Patented Oct. 31, 1961

1

3,006,569
SELF-ALIGNING STOCK WIND-UP
Victor H. Hasselquist, Akron, Ohio, assignor to The
B. F. Goodrich Company, New York, N. Y., a corporation of New York
Filed Jan. 27, 1958, Ser. No. 711,311
9 Claims. (Cl. 242—67.3)

This invention relates to the art of winding up or coiling rubberized fabric stock in cloth liners. The stock, as used in a pneumatic tire construction, for example, may be what is known in the art as weftless, or weak-wefted fabric. This material in the weftless form is formed by drawing a large number of individual cords from the spools on which the cords are wound into parallel, side by side relation and passing such cords through a calender to coat the cords with unvulcanized rubber. The wide rubber-coated length of stock is thereafter cut transversely on the bias to form individual strips or lengths of bias cut fabric, and these lengths are then joined end to end in a splicer to form a relatively narrow continuous length of stock, the cords of which extend transversely at an angle to the edge of the strip. This strip of stock is not only tacky, but has little strength in the longitudinal direction of the strip. In many operations such as tire building, the strip of spliced stock is laid on a flat belt conveyor from which it must be wound up along with a square-woven fabric liner onto a stock roll. The roll of interlined stock is taken to the tire building machine where the stock is unwound from the liner and cut or torn to length to form one of the plies of the tire carcass. The aforesaid tackiness of the stock dictates that it cannot be wound too tightly in its liner because if it is the stock will be distorted and damaged when it is unwound. On the other hand, if the stock is wound in the liner too loosely, the roll or coil of stock and liner will telescope when the roll is up-ended. Also, because the stock is longitudinally stretchable, as well as being very flexible, the stock must be precisely handled relative to tension force (or lack of tension force) during the wind-up process.

Two basically different forms of stock wind-up devices have been proposed. In one form, the wind-up or stock roll is positively driven by a constantly variable speed drive with loops or festoons of the stock interposed between the stock roll and the belt conveyor to accommodate minor irregularities in peripheral speeds. Such apparatus is complicated and expensive and even so, close control of tension on the liner and stock is difficult to achieve.

The other type of wind-up is one wherein the stock (wind-up) roll rests upon and is driven by the very belt conveyor that delivers the stock. This automatically insures that the wind-up roll will be driven at the peripheral speed of the belt, but numerous difficulties are encountered with this type of apparatus. For example, if the stock roll is not exactly perpendicular to the path of the conveyor belt, or if one edge of the stock is thicker, or more or less flexible than the other, or if foreign matter is introduced between the stock and liner, the roll tends to form as a cone and the stock is not wound up uniformly—it may weave from side to side or it may telescope all to one side. Furthermore, the liner must enter the roll at zero tension or the roll will slip on the conveyor belt and pile up the stock. There is no way to operate such apparatus with a controlled, predetermined tension on the liner, nor is there any way to impart a predetermined, controlled stretch to the stock, if such is desired.

With this invention the following advantages are realized:

2

(1) No variable speed drive of the wind-up roll and no festoons are required.

(2) The liner enters the stock (wind-up) roll under a predetermined tension. This insures an even regular wind-up.

(3) The liner tension can be adjusted and the adjustment will be maintained under various atmosphere and temperature conditions.

(4) A controlled, predetermined and constant stretch can be imparted to the stock, if desired, by a simple adjustment of the apparatus.

(5) In one form of the invention, the stock is readily started on the stock roll with a minimum of danger of spoiling the front end of the strip of stock with attendant waste due to the necessity for tearing off such spoiled end.

Briefly, these advantages are attained by mechanism that feeds the liner to the stock roll at the same speed as that of the stock conveyor belt (although the liner may be supplied at a slightly higher speed if it is desired or is permissible to stretch the stock) while maintaining a selected, steady tension on the liner. This action has been found to give a wind-up that is very even and regular, is tight enough to prevent telescoping when the stock is up-ended, and yet is not so tight as to make it difficult to clear the stock from the liner at the tire building or other fabricating station. Also, by increasing the relative speed of liner feed to conveyor belt speed, the stock may be given a selected degree of stretch, insuring that there will be no stock build-up or pile-up at the stock roll.

The manner in which these and other advantages may be obtained will be apparent from the following detailed description of two preferred embodiments of the invention.

Figure 2:
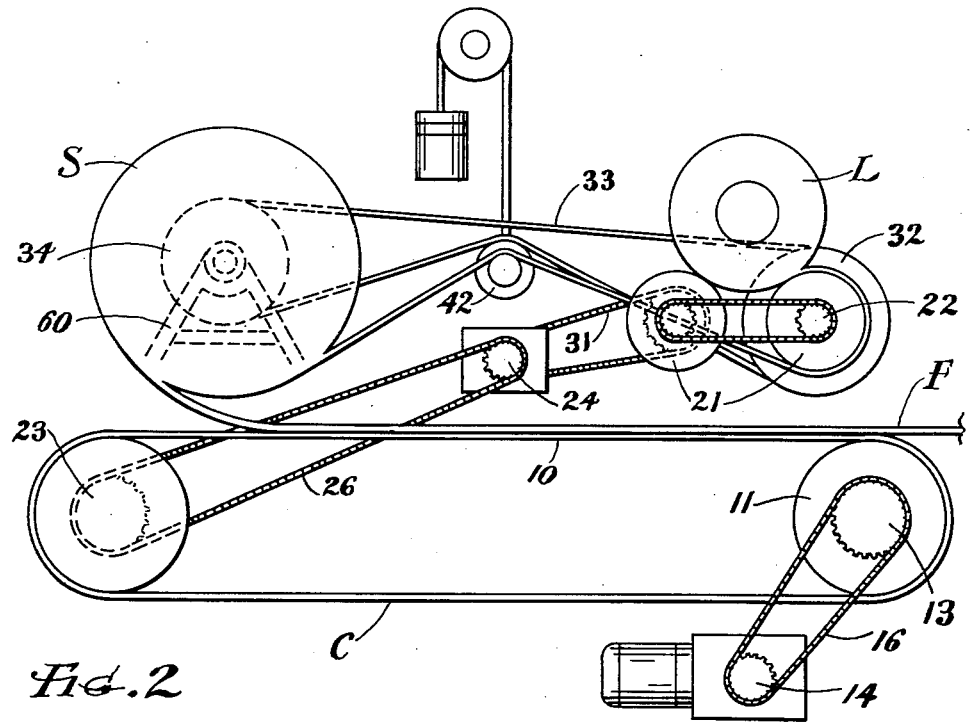

In the drawings:

FIG. 1 is a partially diagrammatic perspective view of one form of apparatus embodying the invention; and FIG. 2 is a side view of a modified form of the apparatus.

Referring to FIG. 1, major elements of the apparatus are a belt conveyor C that receives rubberized fabric stock F from the splicer (not shown), a fabric liner let-off roll L, and a stock (wind-up) roll S. The conveyor C has a flat belt 10 driven by a drive roll 11 mounted in bearings at 12 in the usual frame, the framework and other conventional design aspects of the machine being omitted for clarity and simplicity of illustration. Drive roll 11 is driven by sprockets 13, 14 and chain 16 from a speed reducer 17 and motor 18 in the usual manner, details of the drive forming no part of the invention. The conveyor has the usual idler roll 19 at its other end.

A pair of rubber covered rolls 21 are journaled above the belt 10 and caused to turn in the same direction and at the same speed by a chain and sprocket drive assembly 22. The rubber covered rolls support and cradle the liner let-off roll L causing the latter to be frictionally driven at a peripheral speed determined by the speed at which the rubber covered rolls are operated. In order to drive the rubber covered rolls, a drive sprocket 23 is connected to the conveyor idler roll shaft and drives sprocket 24 by chain 26, sprocket 24 being the input drive to a variable speed mechanism 27. The output sprocket 28 of the mechanism drives sprocket 29 on the shaft of one of the rubber covered rolls by means of chain 31. The drive is adjusted so that the peripheral speed of the liner on let-off roll L is at least equal to that of the stock F on the conveyor, although if it is desired to stretch the stock, the peripheral or linear speed of the liner may be slightly higher than that of the conveyor belt. Of course, speed variations may be effected by selection of sprocket sizes instead of by a variable speed drive, these being mere machine design details not affecting the mode of operation of the apparatus.

It is an important feature of the invention that the stock roll S is also driven, and in such a manner as to place the liner L under a predetermined and constant tension as it is wound up with the stock. This is accomplished by means of an impositive drive, which, in the preferred embodiment of the invention, is a friction drive arranged for controlled slippage. The drive comprises a drive pulley 32 keyed to the shaft of one of the rubber rolls that turns the liner let-off roll, a leather belt 33, and a drive pulley 34 keyed to the shaft 36 of the stock roll S. The stock roll rests on the conveyor belt 10 and is mounted for free vertical motion relative to the belt 10 by swinging arm 37 pivoted on the shaft 38 of the rubber covered roll that carries friction drive pulley 32. Drive pulley 32 is 10%–20% larger in diameter than drive pulley 34 so that stock roll S, which is of about the same diameter as rubber roll 21 tends to be driven at a peripheral speed higher than that of the liner. As the material winds up on stock roll S its peripheral speed will, of course, tend to increase still further. The frictional force of the rubber covered rolls 21 in driving the liner let-off roll exceeds that developed by the leather belt and pulley drive to that the belt drive to the stock roll must slip, thereby exerting a steady tension on the liner which actually controls the peripheral speed of the surface of the roll of material wound up on stock roll S.

The liner tension adjustment and control means embodies an idler tension roll 41 and an idler pulley 42, both being mounted for free rotation on idler shaft 43 by suitable ball bearing assemblies. Idler pulley 42 is lifted against the lower reach of leather belt 33 by any suitable bias means, counterweights being a simple and preferred arrangement. To this end the shaft 43 for the idler roller 41 is supported in a block 44 that slides in a locating guide 46. Counterweight 47 hangs from cable 48 passing over direction changing pulley 49 and the cable is anchored to the shaft support block 44. To control or adjust the tension placed on the liner by the friction drive, small additional weights 51 may be added to or removed from the system.

In operation a full liner roll is set down on rubber covered rolls 21 and the free end of the liner is given a turn or two about the empty stock roll S. As the rubberized fabric material F approaches the stock roll S, the leading corner 52 is laid up around the liner, and since the stock roll is on the conveyor there is little chance of folding or tearing the relatively delicate cord fabric, so that seldom need any fabric be cut or torn from the leading edge.

Since the liner is driven at a fixed peripheral speed equal to or slightly greater than that of the conveyor belt 10, and since the stock roll tends to be driven at a nominally greater speed through the leather belt and pulley drive, the liner is placed under steady tension as it winds up on the stock roll. This has been found to result in even wind up without telescoping, and irregularities in stock thickness, etc. do not cause temporary or uni-directional misalignment.

The tension in the liner tends to straighten the reach of liner that extends between the let-off and stock rolls, thus liner tension opposes the action of the counterweights which tend to lift idler pulley 42 against the leather belt to increase the frictional force of the drive. These opposing actions result in automatic regulation of liner tension to an amount predetermined by the number of weights 51 added to the basic counterweight. This self-regulating action also corrects for variations in the coefficient of belt friction due to atmospheric, temperature or other variable operating conditions.

If it is desired to impart a slight stretch to stock F, the variable speed drive 27 is adjusted to drive the rubber covered rolls 21 at a peripheral speed higher than that of conveyor belt 10, by an amount representing the desired degree of stretch. Of course, speed adjustment can also be made by changes in sprocket diameters, this being a mere machine design detail.

In the form of FIG. 2, the stock roll does not rest directly on the conveyor belt, but rather is supported independently by fixed journal means 60. The mode of operation is the same as that of the form of FIG. 1, the peripheral speed of the roll of material on stock roll S being exactly controlled by the peripheral speed of the liner let-off roll, the latter of which is synchronized with the speed of belt 10, and the tension in the liner being automatically adjusted by the reduction in tension of the drive belt 33 in the same manner.

It will be recognized that in actual practice, the conveyor can be twice as long as that shown to accommodate two wind-up units, so that one unit is always in operation while the other is being loaded and unloaded.

Having completed a detailed description of an embodiment of the invention so that those skilled in the art may practice the same, I claim:

1. Wind-up apparatus for coiling rubberized fabric stock in a cloth liner comprising a belt conveyor for said stock, a liner let-off roll, and a stock and liner wind-up roll, means to drive said conveyor belt, means on which said liner let-off roll is supported to drive said let-off roll at the same or a slightly higher peripheral speed as that of said conveyor belt, an impositive drive which tends to turn said wind-up roll at a nominal peripheral speed that is somewhat higher than the peripheral speed of said conveyor belt and let-off roll, and means responsive to liner tension connected to said impositive drive to decrease the torque transmitted by said impositive drive to said wind-up roll as the liner tension increases.

2. Wind-up apparatus for coiling rubberized fabric stock in a cloth liner comprising a belt conveyor for said stock, a liner let-off roll, and a stock and liner wind-up roll, means to drive said conveyor belt, a pair of friction rollers to drive said let-off roll, means to drive said friction rollers at a peripheral speed that is at least equal to the peripheral speed of said conveyor belt, a friction belt drive which tends to turn said wind-up roll at a nominal peripheral speed that is somewhat higher than the peripheral speed of said conveyor belt and let-off roll so that tension of said liner causes slippage of said belt drive, an idler for said belt drive, and means responsive to liner tension connected to said idler to decrease the driving tension of said belt drive as the liner tension increases.

3. Wind-up apparatus for coiling rubberized fabric stock in a cloth liner comprising a belt conveyor for said stock, a liner let-off roll, and a stock and liner wind-up roll, means to drive said conveyor belt, a pair of friction rollers to drive said let-off roll, means to drive said friction rollers at substantially the same peripheral speed as that of said conveyor belt, a friction belt drive which tends to turn said wind-up roll at a nominal peripheral speed that is somewhat higher than the peripheral speed of said conveyor belt and let-off roll, an idler for said belt drive, a roller on said idler engaging said liner between said let-off and wind-up rolls, means to bias said roller to increase the driving tension of said belt drive, tension in said liner opposing said bias means to decrease the driving tension of said belt as the liner tension increases.

4. Wind-up apparatus for coiling rubberized fabric stock in a cloth liner comprising a belt conveyor for said stock, a liner let-off roll, and a stock and liner wind-up roll, means to drive said conveyor belt, a pair of friction rollers to drive said let-off roll, means to drive said friction rollers at a peripheral speed that is at least equal to the peripheral speed of said conveyor belt, a friction belt drive to turn said wind-up roll at a nominal peripheral speed that is somewhat higher than the peripheral speed of said conveyor belt and let-off roll so that tension of said liner causes slippage of said belt drive, an idler for said belt drive, and means responsive to liner tension connected to said idler to decrease the driving tension of said belt drive as the liner tension increases.

5. Wind-up apparatus for coiling rubberized fabric stock in a cloth liner comprising a belt conveyor for said stock, a liner let-off roll, and a stock and liner wind-up roll, means to drive said conveyor belt, a pair of friction rollers to drive said let-off roll, means to drive said friction rollers at a peripheral speed that is somewhat higher than the peripheral speed of said conveyor belt, a friction belt drive to turn said wind-up roll at a nominal peripheral speed that is somewhat higher than the peripheral speed of said conveyor belt and let-off roll so that tension of said liner causes slippage of said belt drive, an idler for said belt drive, and means responsive to liner tension connected to said idler to decrease the driving tension of said belt drive as the liner tension increases.

6. Wind-up apparatus for coiling rubberized fabric stock in a cloth liner comprising means for supporting a liner let-off roll, means for driving said liner let-off roll support means to drive a liner let-off roll thereon at a predetermined peripheral speed, means for supporting a stock-and-liner windup roll, means for guiding stock and a liner to a windup roll on said windup-roll supporting means with said stock fed at the same or a slightly lower speed than the peripheral speed at which the let-off roll is driven, and an impositive drive interconnecting said let-off roll support means and said windup roll support means which impositive drive tends to drive a windup roll on said wind-up roll support means at a nominal peripheral speed that is somewhat greater than the peripheral speed of said let-off roll on the let-off support means.

7. Wind-up apparatus for coiling rubberized fabric stock in a cloth liner comprising a belt conveyor for said stock, a liner let-off roll, and a stock and liner wind-up roll, means for supporting said wind-up roll in engagement with said conveyor belt and for freedom of motion relative to the liner let-off roll toward and away from the belt in parallelism therewith, means to drive said conveyor belt, means to drive said let-off roll at the same peripheral speed as that of said conveyor belt, an impositive drive which tends to turn said wind-up roll at a nominal peripheral speed that is somewhat higher than the peripheral speed of said conveyor belt and let-off roll, and means responsive to liner tension to decrease the torque transmitted by said impositive drive to said wind-up roll as the liner tension increases.

8. Wind-up apparatus according to claim 6 wherein said means for supporting said liner let-off roll comprises a pair of friction rolls to support said liner let-off roll at the periphery thereof.

9. Wind-up apparatus according to claim 8, wherein said drive means for said pair of friction rolls is connected with said means for guiding said stock to synchronize said stock guide speed with the rotational speed of said friction rolls.

References Cited in the file of this patent

UNITED STATES PATENTS

| | | |
|---|---|---|
| 1,957,518 | Woock | May 8, 1934 |
| 2,168,071 | Perry | Aug. 1, 1939 |
| 2,367,777 | Hornbostel | Jan. 23, 1945 |